(12) United States Patent
Nakanishi

(10) Patent No.: US 7,081,298 B2
(45) Date of Patent: Jul. 25, 2006

(54) SPECIFIC GRAVITY-ADJUSTABLE YARNS WITH LOW ELONGATION RATE AND EXCELLENT ABRASION RESISTANCE

(75) Inventor: Shigeru Nakanishi, Hyogo (JP)

(73) Assignee: Yoz-Ami Corporation, Hyogo (JP)

( * ) Notice: Subject to any disclaimer, the term of this patent is extended or adjusted under 35 U.S.C. 154(b) by 0 days.

(21) Appl. No.: 10/267,825

(22) Filed: Oct. 10, 2002

(65) Prior Publication Data

US 2003/0082381 A1 May 1, 2003

(30) Foreign Application Priority Data

Oct. 29, 2001 (JP) ............................. 2001-331534
Jun. 26, 2002 (JP) ............................. 2002-186771

(51) Int. Cl.
B32B 27/32 (2006.01)
A01K 91/00 (2006.01)

(52) U.S. Cl. ...................... 428/394; 428/375; 428/372; 428/379; 428/389; 43/44.98

(58) Field of Classification Search ................ 428/364, 428/375, 373, 389; 87/1, 3, 7, 8
See application file for complete search history.

(56) References Cited

U.S. PATENT DOCUMENTS

| | | | | |
|---|---|---|---|---|
| 1,371,067 A * | 3/1921 | Bird ................................ | 87/1 |
| 2,253,048 A * | 8/1941 | Quindry ........................... | 87/8 |
| 2,649,833 A * | 8/1953 | Crandall .......................... | 87/1 |
| 3,451,305 A * | 6/1969 | Johnson et al. .................. | 87/6 |
| 3,623,397 A * | 11/1971 | Hayashi et al. .................. | 87/6 |
| 4,321,854 A * | 3/1982 | Foote et al. ..................... | 87/6 |
| 4,779,372 A * | 10/1988 | Pozo Obeso ............... | 43/44.98 |
| 4,792,336 A * | 12/1988 | Hlavacek et al. ......... | 623/13.18 |
| 5,318,575 A * | 6/1994 | Chesterfield et al. ....... | 606/151 |
| 5,479,952 A * | 1/1996 | Zachariades et al. ....... | 132/321 |
| 5,540,990 A | 7/1996 | Cook | |
| 5,573,850 A | 11/1996 | Cunningham et al. | |
| 5,628,756 A * | 5/1997 | Barker et al. ................ | 606/139 |
| 5,749,214 A * | 5/1998 | Cook .......................... | 57/310 |
| 5,771,673 A | 6/1998 | Lorch | |
| 5,881,492 A | 3/1999 | Abiru et al. | |
| 5,901,632 A * | 5/1999 | Ryan .............................. | 87/13 |
| 6,148,597 A | 11/2000 | Cook | |
| 6,303,078 B1 * | 10/2001 | Shimizu et al. ................. | 422/8 |
| 6,605,348 B1 * | 8/2003 | Ohta et al. ................... | 428/364 |
| 6,671,997 B1 * | 1/2004 | Lindgren ................... | 43/44.98 |
| 6,716,234 B1 * | 4/2004 | Grafton et al. ............. | 606/228 |
| 2003/0226309 A1 * | 12/2003 | Lindgren ................... | 43/44.98 |
| 2004/0069132 A1 * | 4/2004 | Knudsen et al. ................. | 87/1 |

FOREIGN PATENT DOCUMENTS

| | | |
|---|---|---|
| EP | 0 398 434 B1 | 2/1994 |
| GB | 2 218 312 | 11/1989 |
| JP | 1-256335 | 10/1989 |
| JP | 1-304837 | 12/1989 |
| JP | 3-2832 | 3/1991 |

(Continued)

OTHER PUBLICATIONS

"PowerPro" Aug. 2, 2002.*

(Continued)

*Primary Examiner*—Jill Gray
(74) *Attorney, Agent, or Firm*—Morrison & Foerster LLP (57) ABSTRACT

This invention is to provide yarns including fishing lines which contain ultra-high molecular weight polyethylene filaments with low elongation rate, adjustable specific gravity and excellent abrasion resistance, and to provide a method for manufacturing the same.

26 Claims, 1 Drawing Sheet

1 ceramic guide
2 Test sample
3 Load
4 Stationary portion
5 Drum
6 Crank arm
7 Crank

| | FOREIGN PATENT DOCUMENTS | |
|---|---|---|
| JP | 03-072832 | 3/1991 |
| JP | 4-330241 | 11/1992 |
| JP | 4-335849 | 11/1992 |
| JP | 5-316909 | 12/1993 |
| JP | 6-46725 | 2/1994 |
| JP | 6-200207 | 7/1994 |
| JP | 3-118978 | 5/1995 |
| JP | 7-184519 | 7/1995 |
| JP | 7-207542 | 8/1995 |
| JP | 7-229031 | 8/1995 |
| WO | WO 96/30568 | 10/1996 |

OTHER PUBLICATIONS

"CSR Incorporated", 2002.*

"Honeywell Advanced Fibers and Composites", undated.*

* cited by examiner

Figure 1

1 ceramic guide
2 Test sample
3 Load
4 Stationary portion
5 Drum
6 Crank arm
7 Crank

SPECIFIC GRAVITY-ADJUSTABLE YARNS WITH LOW ELONGATION RATE AND EXCELLENT ABRASION RESISTANCE

TECHNICAL FIELD

This invention relates to yarns with quite a low elongation rate, which comprises that include ultra-high molecular weight polyethylene filaments, and to their manufacturing method.

BACKGROUND ART

Recently, with higher development of fishing technique, high performance of fishing line has been demanded. One of the high performances is low elongation rate. The smaller the elongation rate is, the more precisely a man can feel the point when the fish are biting, which directly reflects on good fishing results.

However, lower elongation rate of the yarns produces a problem of lower abrasion resistance. That is, lowering the elongation rate of the yarns results in generation of fibril, and thus abrasion resistance is lowered.

Besides, traditionally, fishing line has specific gravity inherent to the materials. There has been the market request for changing the specific gravity of the line delicately depending on weather and/or tidal current conditions, not restricted to material-inherent specific gravity.

Hitherto, a fishing line made from ultra-high molecular weight polyethylene filament has been widely known as a fishing line with low elongation rate. However, no fishing line has existed that shows not only low elongation rate but also excellent abrasion-resistance or adjustable specific gravity.

DISCLOSURE OF THE INVENTION

It is an object of this invention to provide a yarn including a fishing line which comprises ultra-high molecular weight polyethylene filaments that have low elongation rate and adjustable specific gravity or show excellent abrasion resistance. It also provides a manufacturing method of said yarns and a fishing line.

The inventors of this invention have extensively studied so as to attain the objects above, and as a result, have succeeded in manufacture of yarns that show low elongation rate of not more than 5% and can designate specific gravity in the range from 0.1 to 10.0. Besides, the inventors have succeeded in creation of yarns with elongation rate of not more than 5% and tensile strength of not less than 14.0 g/d after 1000 times repetitive abrasion test. Namely, the inventors have realized bi-functional yarns despite the traditional concept that reduction of elongation rate and maintenance or improvement of abrasion resistance cannot exist together.

Besides, the inventors have completed this invention after extensive research and development.

Namely, this invention relates to;

(1) A yarn comprising an ultra-high molecular weight polyethylene filament, said yarn having an elongation rate of not more than 5% and a specific gravity of 1.01 to 10.0;

(2) A yarn as described above (1), wherein an outer surface of the yarn is coated with a resin;

(3) A yarn as described above (2), wherein the resin contains metal particles;

(4) A yarn as described above (2), wherein the resin comprises a synthetic resin possessing a melt index of not less than 0.1 g/10 min;

(5) A yarn as described above (1), comprising a plurality of said ultra-high molecular weight polyethylene filaments, combined by means of a heat-adhesive resin;

(6) A yarn as described above (5), wherein the heat-adhesive resin is a hot-melt adhesive;

(7) A yarn as described above (5), wherein the heat-adhesive resin is a polyolefin copolymer, a polyester copolymer or a polyamide copolymer;

(8) A yarn as described above (5), wherein the melting point of the heat-adhesive resin is between 50° C. and 160° C.;

(9) A yarn as described above (1), further comprising another filament that is not an ultra-high molecular weight polyethylene filament;

(10) A yarn as described above (9), wherein the other filament comprises a polyacetal resin;

(11) A yarn as described above (9), wherein the other filament contains metal particles;

(12) A yarn as described above (11), wherein the metal particles are tungsten particles;

(13) A yarn as described above (9), wherein the other filament is a metal wire;

(14) A yarn as described above (13), wherein the diameter of the metal wire is not more than 0.5 mm;

(15) A yarn as described above (13), wherein the metal wire is a lead wire;

(16) A yarn as described above (13), further comprising metal wire fragments that are buried in a core of the yarn along the metal wire with intervals in a non-continuous manner;

(17) A yarn as described above (1), wherein the elongation rate of the yarn is not more than 3%;

(18) A yarn as described above (1), wherein the yarn is twisted with a twist parameter of 0.2 to 1.5;

(19) A yarn as described above (1), wherein the yarn is a braid;

(20) A yarn as described above (19), wherein a braiding angle of the braid is from 5° to 90°;

(21) A fishing line comprising a yarn as described above (1);

(22) A yarn comprising an ultra-high molecular weight polyethylene filament, said yarn having an elongation rate of not more than 5% and a tensile strength of not less than 14.0 g/d after a 1000 times repetitive abrasion test;

(23) A yarn as described above (22), wherein an outer surface of the yarn is coated with a resin;

(24) A yarn as described above (23), wherein the resin comprises a synthetic resin possessing a melt index of not less than 0.1 g/10 min;

(25) A yarn as described above (22), comprising a plurality of said ultra-high molecular weight polyethylene filaments, combined by means of a heat-adhesive resin;

(26) A yarn as described above (25), wherein the heat-adhesive resin is a hot-melt adhesive;

(27) A yarn as described above (25), wherein the heat-adhesive resin is a polyolefin copolymer, a polyester copolymer or a polyamide copolymer;

(28) A yarn as described above (25), wherein the melting point of the heat-adhesive resin is between 50° C. and 160° C.;

(29) A yarn as described above (22), wherein the elongation rate of the yarn is not more than 3%;

(30) A yarn as described above (22), wherein the yarn is twisted with a twist parameter of 0.2 to 1.5;

(31) A yarn as described above (22), wherein the yarn is a braid;

(32) A yarn as described above (31), wherein a braiding angle of the braid is from 5° to 90°;

(33) A yarn as described above (22), wherein color fastness to rubbing is not less than grade 4.;

(34) A fishing line comprising a yarn as described above (22);

(35) A method for manufacturing a yarn comprising an ultra-high molecular weight polyethylene filament and having an elongation rate of not more than 5%, the method comprising:

a first step of;

(a) drawing separately the ultra-high molecular weight polyethylene filament and an additional filament, followed by combining the drawn filaments, or (b) combining the ultra-high molecular weight polyethylene filament and an additional filament, followed by drawing the combined filaments, and optionally a second step of coating with a resin an outer surface of the combined filaments formed in the first step;

(36) A method as described above (35), wherein the additional filament is an ultra-high molecular weight polyethylene filament;

(37) A method as described above (35), wherein the additional filament is a filament that is not an ultra-high molecular weight polyethylene filament;

(38) A method as described above (35), wherein the additional filament contains metal particles, a metal wire or both metal particles and a metal wire, and the method further comprises adjusting a specific gravity of the yarn to between 1.01 and 10.0;

(39) A method for manufacturing a yarn comprising an ultra-high molecular weight polyethylene filament and having an elongation rate of not more than 5%, in which yarn-constituting filaments are combined by means of a heat-adhesive resin, the method comprising:

a first step of;

(a) combining an ultra-high molecular weight polyethylene filament and an additional filament, followed by coating with or dipping in an adhesive resin, or (b) combining a yarn made of heat-adhesive resin, an ultra-high molecular weight polyethylene filament and an additional filament, and a second step of heating and drawing the combined filaments in the first step;

(40) A method as described above (39), wherein the additional filament is an ultra-high molecular weight polyethylene filament;

(41) A method as described above (39), wherein the additional filament is a filament that is not an ultra-high molecular weight polyethylene filament;

(42) A method as described above (39), wherein the additional filament contains metal particles, a metal wire or both metal particles and a metal wire, and the method further comprises adjusting a specific gravity of the yarn to between 1.01 and 10.0;

(43) A method as described above (35) or (39), wherein the drawing treatment is a tapered drawing;

(44) A method as described above (35) or (39), wherein the filament used as the staring material is a non-drawn filament;

(45) A method as described above (35) or (39), wherein an oil agent is deposited on a filament or combined filaments before the drawing treatment.

BEST MODE FOR CARRYING OUT THE INVENTION

The yarns of this invention are characterized by the elongation rate of not more than about 5%, preferably not more than about 4.0%, more preferably not more than about 3.0% and much more preferably not more than 2.7%. For example, as for fishing line, the range of elongation rate is preferable from the reason that it realizes appropriate catch of the bite by fish. The elongation rate is measured according to JIS L 1013(1992) and with the universal testing machine of Autograph AG-100kNI produced by SHIMADZU.

Besides, yarns of this invention are preferable if its tensile strength after 1000 times repetitive abrasion test shows not less than about 14.0 g/d, more preferably not less than about 16.0 g/d.

Figure 1:
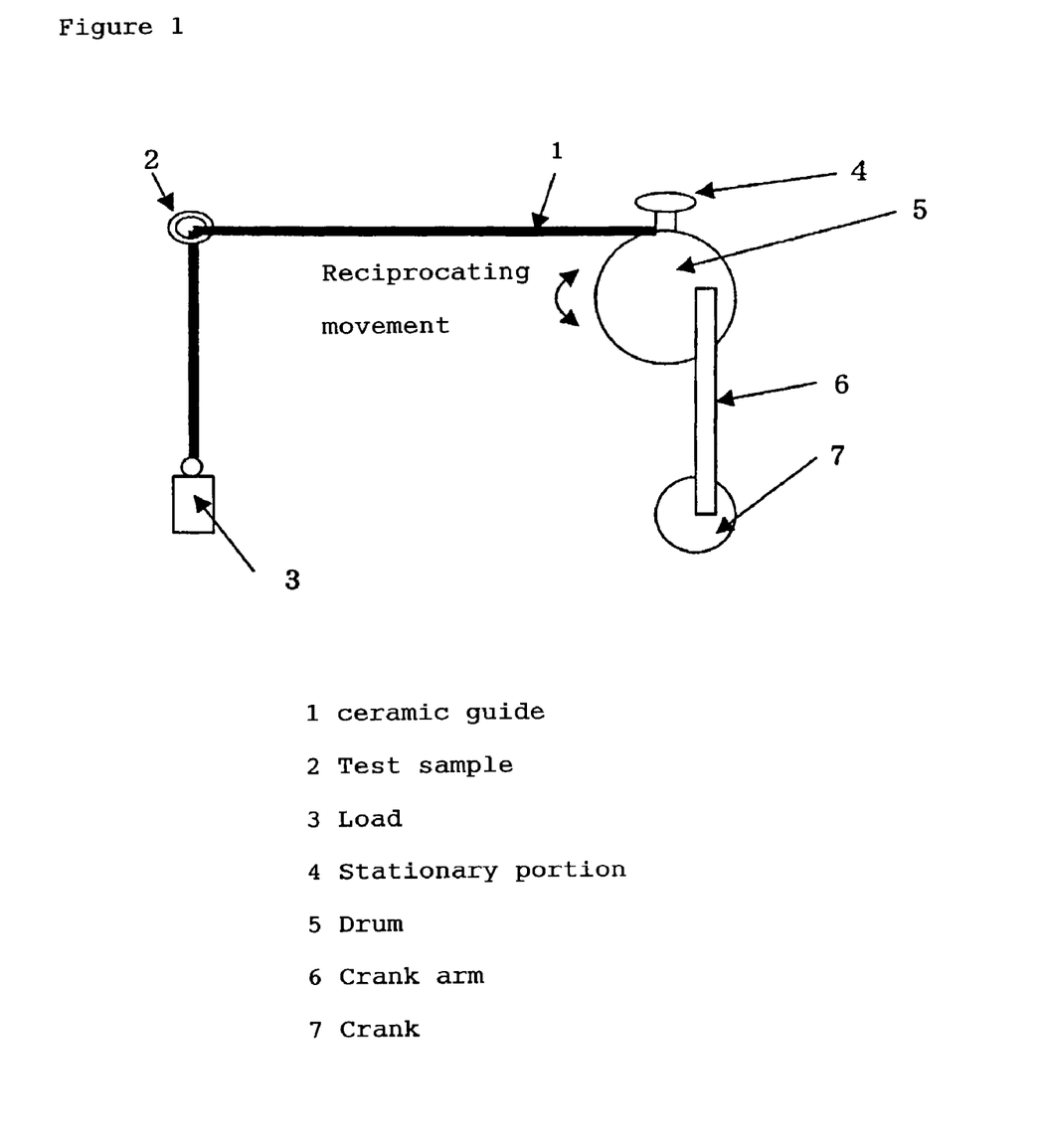
FIG. 1 shows a schematic illustration of a test machine used for abrasion test.

Said abrasion test is conducted as follows. The test machine is shown in FIG. 1, which is a modified model of hexagonal bar abrasion test machine for seat belts, equipped with 9 mm φ ceramic guide 2 in the place of hexagonal bar. The stroke length, angle, etc. of said machine are complied with JIS D 4604 (1995). The sample 1 is placed through the ceramic guide 2, one end of which is fixed to the stationery place 4 of drum 5 and another end pulled by the load 3. The load is 3.3% of ultimate strength of the sample. The drum is reciprocated 1000 times to give abrasion of the sample from the ceramic guide. Then, tensile strength of the abraded portion of the sample is measured. From the values of tenacity strength before abrasion (a) and after abrasion (b), the residual tenacity strength (c) is evaluated from the following equation; c(%)=a/b×100. The higher c value is interpreted to be a better abrasion resistance. The strength is measured according to JIS L 1013 (1992) and with the universal testing machine of Autograph AG-100k NI (SHIMADZU Corp.).

Besides, yarns of this invention are preferable if the specific gravity is within the range from 1.01 to 10.0. Specific gravity is measured with the electronic specific gravity meter SD-200L (MIRAGE TRADING Co., Ltd).

Besides, in yarns of this invention, color fastness to rubbing is preferably not less than grade 3, more preferably not less than grade 4. Color fastness to rubbing is measured according to JIS L 0849(1996).

Yarns of this invention can be constituted with either single or plural filaments, but the plural filaments are more preferable. In either case, as constituting filaments of the yarns of this invention (referred simply as constituting filaments' hereinafter), yarns of this invention are characterized by containing at least of ultra-high molecular weight polyethylene filaments.

"Filament" of this invention refers to any types of, for example, multi-filament, monofilament, or mono-multi filament. Besides, these filaments can be twisted.

When yarns of this invention are constituted with plural filaments, these plural filaments are preferably combined. Namely, the plural constituting filaments are preferably fixed. More specifically, preferred yarns are those having such a structure that even when one of the filament constituting the yarn is cut, the filament does not fall apart. Furthermore, preferable structure is one which is not apt to be scattered when the yarns of the present invention are cut off.

The actual modes of the yarn are (a) yarns whose outer surface is coated with resin, or (b) yarns whose constituting filaments are combined by the means of a heat-adhesive resin.

One embodiment of the yarns of this invention composed of plural constituting filaments, whose outer surface is coated with resin, is described in the following. By coating yarns with a resin, deformation in twisted or braided form of the yarns of the present invention can be prevented, low elongation rate can be maintained, and water resistance and weather resistance in addition to abrasion resistance can be improved. In this invention, upon resin coating, the resin can either cover only the outer surface of yarns or penetrate into the inner of yarns. Especially, it is preferable that the penetration of the resin into the inside of yarns contributes to the integration of the constituting filaments.

In the above embodiment, yarns prior to the resin coating can be paralleled yarns made of pulling and arranging plural constituting filaments or twisted yarns of twisting said paralleled yarns, or braided yarns of plural constituting filaments.

If the yarns prior to the resin coating treatment is twisted yarns, the twist parameter K is from 0.2 to 1.5, more preferably from about 0.3 to 1.2, much more preferably from about 0.4 to 0.8. In order to maintain abrasion resistance, twist parameter is preferably not less than about 0.2, and to lower the elongation rate of the yarns, twist parameter is preferably not more than about 1.5. The twist parameter K can be calculated from the equation: $K = t \times D^{1/2}$ (wherein, t: the count of twists (rotation/m), D: textile fineness (tex)).

The textile fineness in the equation is measured by JIS L 1013 (1999).

Besides, if the yarns before resin-coating surface thereof are braided yarns, braided angle is preferably from 5° to 90° or so, more preferably from 5° to 50° or so, much more preferably from 20° to 30° or so.

In order to maintain abrasion resistance, braided angle is preferably not less than about 5°, and to lower the elongation rate of the yarns, the braided angle is preferably not more than 90°. The braided angle is measured with the digital HD microscope VH-7000 (KEYENCE CORPORATION).

The resins used for coating in this invention (referred simply as "coating resin" hereinafter) can be known resins so long as they can be attached closely to constituting filaments or their twisted yarns or their braided yarns. Especially, the coating resin which stands against outside long use, and has excellent durability against friction and flexural loading is preferable. Said coating resin has the melt index of preferably not less than about 0.1 g/10 min, more preferably about 0.1 g/10 min to 1000 g/10 min. In order to coat without damaging tensile strength of the yarns, which is a core, coating resin with said melt index range is preferable. The melt index of the resin is measured by JIS K 7210 (1976) "Flow testing method of thermoplastics" using the Melt Indexer (L-202 produced by TAKARA Corp.).

Examples of the coating resins that meet said characteristics are polyolefin resins such as high-density polyethylene, polypropylene, ethylene-vinyl acetate copolymer, etc. or its derivatives thereof, polyamide resins such as nylon or copolymer nylon, etc., acryl resins or copolymer derivatives thereof, polyurethane resins, polystyrene resins, vinyl acetate resins, poly vinyl chloride resins or epoxy resins, etc.

As for coating resin used in this invention, a resin containing metal particles may be used. The inclusion of such metal particles has an advantage in manufacturing yarns with arbitrary specific gravity, especially large specific gravity, regardless of inherent specific gravity of the resin to be used for such coating.

Examples of the metal in said metal particles are iron, copper, zinc, tin, nickel, tungsten, etc., which are used solely or in the form of mixture or alloy. Among the metal particles, tungsten particles are most preferable, because they easily gives weight to the yarns, prevents decline of tensile strength as much as possible and increases specific gravity by their addition in a small amount.

These metal particles can be used in the form of powder or granule in this invention. The average particle diameter is not more than about 20 μm, preferably not more than about 10 μm. If the particle diameter of the metal particle is too large, total uniformity after mixing becomes poor. Besides, the amount of addition is within the range from 1 to 90 parts by weight, more preferably 5 to 70 parts by weight to 100 parts by weight of coating resin.

The coating resin containing said metal particles can be manufactured by melt-kneading metal particles with a coating resin using a mono-axial or biaxial kneader, which is a well-known method.

Yarns of above-mentioned embodiment in this invention preferably have strength sustainability of not less than about 70%, more preferably not less than about 85%, much more preferably not less than about 95%.

The strength sustainability is an index to show how much tensile strength of the yarns coated with resin is maintained compared to the yarns before coating, that is, to the tensile strength of the core yarns. Namely, strength sustainability is expressed in the following.

Strength sustainability (%)=((tensile strength of yarns in this invention)/(tensile strength of yarns prior to resin coating))×100

Tensile strength is measured according to JIS L 1013 (1992) using the universal testing machine of Autograph AG-100kNI (SHIMADZU Corp.).

As one of the embodiments of the present invention, yarns composed of plural constituting filaments, which are combined by means of a heat-adhesive resin, are to be illustrated in the following.

In this invention, a method of integration of the plural constituting filaments and a heat-adhesive resin is not limited specifically. An example of such integration is melt-adhesion of the constituting filaments and heat-adhesive resin. Said melt-adhesion is conducted as follows. Namely, there are exemplified by (a) a method wherein the constituting filaments are impregnated with heat-adhesive resin by the known method, such as a method for immersing the filaments in a bath filled with heat-adhesive resin, or the constituting filaments are coated with heat-adhesive resin by the known method, followed by lining up the filaments, and then subjected to, if desired, twisting process, braiding process, and heating treatment for the purpose of melt-adhesion, and (b) a method wherein, by use of a heat-adhesive resin in the form of yarns (hereinafter referred simply to "heat-adhesive resin yarns"), all the constituting filaments are arranged to be contacted with heat-adhesive resin yarns, followed by optional twisting, braiding, and heating treatment, thereby causing melt-adhesion.

Examples of said heat-adhesive resin yarns can be yarns made from heat-adhesive resin or yarns whose core yarn is coated with heat-adhesive resin.

In the latter case, as core yarns, said ultra-high molecular weight polyethylene filament or other filaments other than the ultra-high molecular weight polyethylene described below can be appropriately used. The core yarns are preferably from about 10 to 50 μm thick.

Coating can be carried out by known methods. For example, the core yarns are immersed into the bath filled with heat-adhesive resin, and remove excess amount of resin, followed by drying. Heat-adhesive resin yarns produced by coating are preferably from about 1.3 to 3 times of the core yarn thickness.

Temperature of melt-adhesion of the constituting filaments and heat-adhesive resin is normally higher than the melting point of the heat-adhesive resin, and lower than the melting point of constituting filaments, and preferably from about 50 to 200° C., more preferably from about 50 to 160° C. and much more preferably from about 60 to 130° C.

The melting point of heat-adhesive resins used in melt-adhesion of said constituting filaments is preferably lower than that of constituting filaments. Said heat-adhesive resin is, for example, a resin having a melting point in the range from about 50 to 200° C., preferably from about 50 to 160° C., more preferably from 60 to 135° C., and much more preferably about 100° C. Said melting point is measured by well-known method such as JIS L 1013 (1999) using the well-known measurement machine, such as DSC-7 of PerkinElmer, Inc.

As a heat-adhesive resin, well-known resins can be used so long as they have said melting point, such as polyolefin resin, polyester resin, or polyamide resin, etc.

Among all, examples of said heat-adhesive resins are preferably non-rigid polyolefin resin composed of polyolefin copolymer with its major components such as polyethylene or polypropylene, if they are softened by heating 10 seconds at temperature of about 50° C. Besides, poly-olefin resin is preferable with its melting point of about 100° C. and low viscosity during melting process. Those kinds of poly-olefin resins show easy flowability even after a short hour of heating, and can not only diffuse at the fiber surface but penetrate into the center, thereby fulfilling excellent adhesion properties.

It is preferred to use a hot melt adhesive as the heat-adhesive resin. Such hot melt adhesive is one composed of 100% solid whose major component is a thermoplastic polymer, which exerts adhesive power upon solidification by cooling after being melted in order to lower its viscosity and then applied. In this invention, hot melt adhesives are not specifically limited so long as they are those as mentioned above, but well-known hot melt adhesives may be used as well. Among all, the preferred hot melt adhesives used in this invention are those which do not melt at a temperature of lower than about 100° C. after being hardened. Such temperature requirement results in prevention of hot melt adhesive from its solidification in the spool-winded form due to its dissolution during transportation or storage of the yarns of this invention. Further, the melting point of such hot melt adhesive is preferably lower than that of the constituting filament.

Examples of hot melt adhesives employed in this invention are, for example, ethylene-vinyl acetate copolymer (EVA) adhesives, polyethylene adhesives, polyolefin adhesives, thermoplastic rubber adhesives, ethylene-ethyl acrylate (EEA) adhesives, polyvinyl acetate copolymer adhesives, polycarbonate (PC) adhesives, etc., depending on the kind of base polymers, among which polyethylene or polyolefin adhesives are preferable.

As a hot melt adhesive employed in this invention, a reactive hot melt adhesive is more preferable. In the reactive hot melt adhesive, cross-linking reaction takes place after adhesion, thereby resulting in enhancement of improved heat resistance. More specifically, the reactive hot melt adhesive is melted at relatively low temperature, followed by application and impregnation to constituting filaments. However, once adhesion takes place, this type of adhesive will not be melted at low temperature, concretely not more than about 100° C. Use of the reactive hot melt adhesive minimizes a possibility as much as possible that hot melt adhesive will melt out during transportation or storage.

A reactive hot melt adhesive in this invention is not specifically limited, but well-known adhesives can be used. Among all, upon application of the adhesives, adhesives that can be melted at relatively low temperature, more preferably from about 60 to 130° C., more preferably from about 70 to 100° C. are desired.

Examples of said reactive hot melt adhesives can be mentioned below wherein they are classified depending on the type of cross-linking reaction. For example, (a) ion cross-linked type hot melt adhesive capable of cross-linking a carboxyl group in polymers with a polyvalent metal ion; (b) heat cross-linked type of hot melt adhesive which becomes thermal hardening after adhesion; (c) hot melt adhesive which enables cross-linking reaction by radiating high-energy beam such as electron or ultra violet beam using a double-bonded block copolymer or a polyester; (d) wet hardening-type hot melt adhesive which forms cross-linkage by reaction with moisture in the air or in substrates after melting and application; or (e) hot melt adhesive obtained by melting separately a polymer having various functional groups and an additive or a polymer capable of reacting such functional groups, and applying the melted product after mixing just before its application, whereby two liquids are reacted to form a cross-linkage.

As a reactive hot melt adhesive in this invention, heat cross-linking type hot melt adhesive or wet hardening-type hot melt adhesive is preferable and wet hardening-type hot melt adhesive is more preferable.

Examples of the heat cross-linking type hot melt adhesives are, more specifically, a hot melt adhesive comprising (a) a carboxyl group or an amino group at the terminal of polyesters or copolyamides, or (b) a block isocyanate, wherein the isocyanate group which is introduced into the molecular terminal or the side chain is blocked by a blocking agent such as caprolactam or phenol.

Examples of the wet hardening type hot melt adhesives are, more specifically, hot melt adhesives that can be obtained by introducing an alkoxy group or an isocyanate group into polymes.

The ratio of the heat-adhesive resin and the constituting filament is preferably 1:1 to 1:100. When a hot melt adhesive is used as a heat adhesive resin, application amount of the hot melt adhesive is preferably within the range from about 1 to 20 wt %, more preferably from about 5 to 10 wt %, of the total yarns of this invention. Said range is preferable so as to obtain sufficient adhesion and not to lose smooth surface due to sticking out of above-mentioned heat-adhesive resin from the yarns of this invention.

If yarns of above-mentioned embodiment in this invention are twisted yarns, the twist parameter K is preferably from about 0.2 to 1.5, more preferably from about 0.3 to 1.2, much more preferably from about 0.4 to 0.8. In order to maintain abrasion resistance, the twist parameter is preferably more than 0.2, while in order to lower the elongation rate of the yarns, the twist parameter is preferably less than about 1.5. The twist parameter K can be calculated by the equation.

Besides, in case that yarns of above-mentioned embodiment in this invention are a braided yarn, braided angle is preferably from 5° to 90°, more preferably from 5° to 50°, much more preferably from 20° to 30°. In order to maintain the abrasion resistance, braided angle of more than about 5° is preferable, while in order to lower the elongation rate of yarns, braided angle is preferably less than about 90°. The braided angle is measured in the same manner as described above.

The constituting filaments of yarns in this invention will be described below in detail.

As the ultra-high molecular weight polyethylene which constitutes ultra-high molecular weight polyethylene filament used in the present invention, its molecular weight is preferably, more than about 200,000, more preferably, more than about 600,000. Ultra-high molecular weight polyethylene can be either homopolymers or copolymers with lower α-olefins having 3 to 10 carbon atoms, for example, such as propylene, butene, pentene, hexene, etc. As a copolymer of said ethylene and α-olefin, the ratio of α-olefins is from about 0.1 to 20 in average, preferably from 0.5 to 10 per 1000 carbon atoms.

A method for manufacturing ultra-high molecular weight polyethylene filament is disclosed in Japanese Patent Publication for Laid-Open 5228/1980 and 107506/1980, and these per se known methods can be used. Besides, as ultra-high molecular weight polyethylene filament, products in the market such as DYNEEMA (Registered trade name: TOYOBO Co., Ltd) or SPECTRA (Registered trade name: distributed by HONEYWELL) can be used.

The yarns of this invention can include filaments other than ultra-high molecular weight polyethylene filament (referred simply as "other filaments" hereinafter).

With respect to other filaments, they are preferably those which are able to be drawn, because they are subjected to drawn process together with ultra-high molecular weight polyethylene filament for manufacturing yarns of the present invention. Here, "can-be-drawn filament" is a filament that can be drawn.

Examples of said other filaments are, more specifically, filaments composed of a synthetic resin such as polyolefin, polyamide, polyester, fluoro polymer, polyacrylonitrile, polyvinyl alcohol, polyacetal, etc.

More specifically, polyolefin resin, polyethylene or polypropylene, etc. are preferable. Among all, a preferred resin has an average polymerization molecular weight of more than about 400,000. Said polyethylene or polypropylene may be homopolymer or copolymer. More specifically, the preferred copolymer is one which contains a small amount of, preferably less than 5 wt % of one or more alkenes which are copolymerizable with ethylene, and contains 1 to 10, preferably 2 to 6 methyl or ethyl groups per 100 carbon atoms. The alkenes to be copolymerized with said ethylene include, for example, propene, butene, pentene, hexene, octene, and 4-methyl pentene, etc. Besides, ethylene-vinyl acetate copolymer (EVA) is also used as a copolymer an example.

Examples of the polyamide resins are aliphatic polyamides such as nylon 6, nylon 66, nylon 12, nylon 6, 10, etc., or its copolymer, or semi-aromatic polyamide and its copolymer formed by the reaction of aromatic diamines with dicarboxylic acids.

Examples of the polyester resins are polyesters or their copolymer obtained by polycondensation of aromatic dicarboxylic acids such as terephthalic acid, isophthalic acid, naphthalene-2,6-dicarboxylic acid, phthalic acid, α,β-(4-carboxy phenyl) ethane, 4,4'-dicarboxybiphenyl, or 5-sodium sulfoisophthalate, and aliphatic dicarboxylic acids such as adipic acid or sebacic acid, or these esters, and with diol compounds such as ethyleneglycol, diethyleneglycol, 1,4-butanediol, polyethylene glycol, or tetramethylene glycol, etc.

Examples of fluororesin are polyvinylidene fluoride, polytetrafluoroethylene, polymonochlorotrifluoroethylene, or polyhexafluoropropylene or its copolymers As the polyacrylonitrile resin, there are exemplified polyacrylonitrile resins which are a copolymer of acrylonitrile and other polymers. The content ratio of said other polymers in the polyacrylonitrile resin are preferably less than about 5 wt %. Said other polymers are, for example, methacrylate, acrylate, or vinyl acetate, etc.

Polyvinyl alcohol resin is polyvinyl alcohol which is a copolymer of vinyl alcohol and other polymers. Said other polymers are included in the ratio of vinyl acetate, ethene, or other alkene, etc. and said other polymers are contained in the ratio of preferably less than about 5 wt % in polyvinyl alcohol.

The other filaments of this invention can be preferably high-creep filaments. Such high-creep filaments are a filament that can maintain its shape after drawing. More specifically, if a filament is pulled for 100 hours with a load that is one-half of the rupture strength of the fibers constituting filaments, and then the load is removed, the filaments which show permanent elongation of more than about 1%, preferably more than about 5%, or much more preferably more than about 10% are appropriate for high-creep filament. Said permanent elongation is measured by JIS L 1013 (1992) using the universal testing machine of Autograph AG-100kNI (trade name: SHIMADZU Corp.).

The other filaments used in this invention can be preferably filaments composed of polyacetal resins, namely polyacetal filaments.

The polyacetal filaments can be manufactured, for example, by known methods per se such as a method for melting and spinning a polyacetal resin having an acetal bond in the principal chain. The polyacetal filament with the tensile strength of more than about 4 g/d and the elongation rate of less than about 20% is preferable. The tensile strength and elongation rate can be measured by the same method as mentioned above.

The other filaments in this invention may contain metal particles. The inclusion of the metal particles gives advantages in manufacturing any filaments with arbitrary specific gravity, especially those with large specific gravity, regardless of inherent specific gravity of the materials which constitute filaments. The kinds and content of the metal particles are perfectly the same as in the case of coating-resins containing such metal particles.

The other filaments containing metal particles in this invention can be manufacture as described above, by a widely used method wherein the thermoplastic resin containing metal particles is first prepared and then subjected to melt-spinning process.

Besides, the other filaments in this invention may take a form of hollow structure in the melt-spinning process as mentioned above. By making the hollow structure in the other filaments, it provides a merit of buoyancy to the yarns. Besides, adjustment of hollow size or additional inclusion of said metal particles can facilitate to optionally fix a balance of yarn weight and buoyancy when used in a liquid such as fresh water or seawater. As a result, application of yarns of this invention to fishing line or marine materials gives advantage of controlling sedimentation speed of the yarns in fresh water or seawater.

When such a filament has a single hollow, the cross section of the filament becomes partially flat in the manufacture, which leads to decline in the strength of such filament. It is, therefore, desirable that the filament has two or more hollows in the structure. By making a hollow structure wherein two or more hollows are given, there is provided an advantage of preventing the yarns from decline in their strength. There is no particular limitation to the number of such hollow, but it may be appropriately chosen from two to nine hollows.

The other filaments with hollow structure can be easily manufactured, for example, by melt-spinning method using a melt-spinning machine equipped with a spinning clasp for hollow yarns, said spinning machine being capable of forming a desired number of hollows.

Other embodiment of the yarns in this invention is yarns which contain an ultra-high molecular weight polyethylene filament and a metal line as a constituting filament. Since metal has ductility, it can be drawn with desired drawing rate, which makes the diameter of the yarns smaller. As hereinbefore mentioned, ultra-high molecular weight polyethylene filament can be re-drawn. Accordingly, combination of such ultra-high molecular weight polyethylene filament and metal wire enables to produce heavy yarns despite small diameter.

A preferable embodiment of the yarns in this invention is yarns that have a metal wire in the core of yarn structure. Especially, the diameter of the core metal line is preferably less than about 0.5 mm.

A preferable other embodiment of above-mentioned yarns is a yarn, wherein metal wire fragments are buried in the core of the yarn along the wire of the yarn with intervals in a non-continuous manner. More preferred yarn is one wherein metal wire fragments are buried in the core of the braided cord along the wire of the yarn at some intervals in a non-continuous manner, said braided cord being composed of at least ultra-high molecular weight polyethylene filaments.

There is no particular limitation to the metal wire but well-known metal wires may be used. Specifically, examples of such metal wires are copper wire, stainless steel wire, lead wire and soft wire of various alloys, etc., among which lead wire is preferable, because it has large specific gravity and is easily drawn. Besides, section of metal wire may be round or flat (oval).

Besides, in the yarns of said embodiment in this invention, constituting filaments other than metal wire are either ultra-high molecular weight polyethylene filament alone or in combination with other filaments.

In this invention, as long as the objectives of the present invention are not impaired, various well-known abrasion resistant agents, flatting agents, reforming agents, ultraviolet absorbers or pigments, etc. or combination of those materials may be added to the constituting filament. Besides, the constituting filament may contain magnetic materials or conductive substances and materials having high dielectric constant.

The manufacturing method of yarns in this invention will be described in detail as follows.

The manufacturing method of yarns composed of plural ultra-high molecular weight polyethylene filaments, which are one embodiment of yarns in this invention, will be described as follows.

This type of yarns can be manufactured by conjugating plural filaments composed of ultra-high molecular weight polyethylene, followed by drawing said conjugated yarns. Besides, this type of yarns can also be manufactured by drawing ultra-high molecular weight polyethylene filament, followed by conjugating drawn plural filaments composed of ultra-high molecular weight polyethylene. In any one of the above methods, it is preferred to deposite an oil agent on combined yarns or filaments of ultra-high molecular weight polyethylene before the drawing treatment. Such deposition by the oil agent can reduce damage of combined yarns or filaments caused by rubbing against the drawing machine. Moreover, in the case of combined yarns, adjacent filaments are not substantially fused to combine owing to deposition with an oil agent, thereby avoiding loss of molecular orientation in the filaments. As the result, falls of tensile strength, knot strength or color fastness to rubbing caused by fusing filaments can be prevented.

The term "conjugate" in this invention refers to integration of plural filaments in order not to get scattered. The conjugation treatment may be carried out by known methods such as twisting process, braiding process, and fusing process for plural filaments, and so on.

Besides, tapered shape may be formed during drawing process. Namely, upon drawing conjugated yarns composed of plural filaments of ultra-high molecular weight polyethylene, tapered shape is formed to obtain tapered yarns. Besides, ultra-high molecular weight polyethylene filaments are drawn to obtain a tapered shape, followed by conjugating plural tapered ultra-high molecular weight polyethylene filaments, thereby to produce tapered yarns. The former case has an advantage of easy manufacturing of tapered yarns of this invention. Namely, when constituting filaments are subject to conjugation treatment by melt-adhesion process, melt-adhesion can be carried out simultaneously together with drawing process, thereby to eliminate one process. In the latter case, when plural tapered filaments are braided to conjugate, said plural tapered filaments can be braided with the braiding pitch suitable for the diameter of the constituting filament by changing gear of the braiding machine, depending on the diameter of the constituting filament. Such treatment brings about an advantage of improved smoothness of the yarns of the present invention.

A method to form tapered shape during drawing process will be described below.

The yarns of ultra-high molecular weight polyethylene filaments and other filaments, which is another embodiment of the yarns in this invention, can be manufactured in the same manner as described above. In order to conjugate ultra-high molecular weight polyethylene filaments and other filaments, per se known methods in the art can be used, such as twisting, braiding, or melt-adhesion of two kinds of filaments.

Further, melt-adhesion may be carried out by using and braiding other filaments around the core yarn or arranging them in such a manner that the corn yarn is surrounded with them.

The yarns of ultra-high molecular weight polyethylene filament, metal wire and optionally other filaments as constituting filament, which is further embodiment of the yarns of this invention, can be manufactured in the same manner as mentioned above. Among all, it is preferred to use a manufacturing method wherein ultra-high molecular weight polyethylene filaments, a metal wire and optional other filaments are conjugated, followed by drawing said conjugated yarns.

In order to conjugate metal wire, ultra-high molecular weight polyethylene filaments, and optional other filaments, per se known methods can be used. For example, metal wire and ultra-high molecular weight polyethylene filament, and optional other filaments are twisted, braided or melted. Among all, with metal line as a core yarn, ultra-high molecular weight polyethylene filament and optionally other filaments are preferably braided around the core yarn or arranged to surround the core yarn, followed by melting and adhesion.

In the manufacture of yarns according to the present invention, the yarns used as raw material may be a filament which has already been drawn in the manufacturing process, like a commercially available filament, or a filament which is not drawn at all in the manufacturing process, or a filament which is drawn at the lower drawing magnification rate than that in the manufacture of filaments on the market. In this invention, a filament which is not drawn at all in the manufacture or a filament which is drawn at the lower drawing magnification rate than the magnification process of filament on the market is referred as "non-drawn filament." Namely, non-drawn yarns used in this invention are yarns that have not been drawn at the maximum drawing rate. The maximum drawing rate is the rate within which filament is not disrupted in the manufacturing process. Namely, as the drawing rate becomes larger during spinning yarns, tensile strength and stiffness of the filaments increase. However, with the increase of drawing rate, such disruption of filaments occurs frequently in the manufacture, and thus the drawing rate cannot be freely increased. The extent of drawing rate, at which critical disruption occurs and discontinues the drawing rate, or whether the frequency is acceptable can be easily determined by experiments. This drawing rate is referred to the maximum drawing rate.

Especially, when tapered shape is formed during drawing process, non-drawn filaments can be preferably used as constituting filament.

Main processes of the manufacturing of yarns according to the present invention will be discussed below in detail.

In this invention, there is no particular limitation to a method for depositing an oil agent on each constituting filament or combined yarns before the drawing treatment, and per se known methods can be used. To be more specific, such method for depositing an oil agent includes, for example, the dipping oiling method, the spray oiling method, the roller oiling method or the guide oiling method using a metering pump, etc., among which the dipping oiling method or the spray oiling method is preferably used. Thus, in case an oil agent is deposited before the drawing treatment, combined yarns or each constituting filament may be optionally washed with water after the drawing treatment.

The oil agent using in the above process is not restricted as long as it is the commonly used oil agent for deposition on fibers. To be more specific, such oil agent includes, for example, a binding resin (binder), a based lubricating oil or a surface active agent, or a mixture thereof. The binding resin includes, for example, polyurethane resin, silicone resin and fluororesin, etc. The based lubricating oil includes, for example, dimethylpolysiloxane and polyether, etc. The surface active agent includes, for example, higher alcohol, higher alcohol fatty acid ester, polyoxyethylene—higher alcohol ether, polyoxyethylene—higher fatty acid ester, polyethylene glycol-higher fatty acid ester, polyoxyethylene—alkylamino ether, polyoxyethylene—castor oil ether, salt of alkyl phosphate (preferably alkali metal salt or amine salt), salt of polyoxyethylene alkyl ether phosphate (preferably alkali metal salt or amine salt), sodium alkylsulfonate, etc. These compounds may be used solely or in combination thereof.

The polyurethane resin includes high molecular weight polymer obtained by the reaction between polyether polyol and polyisocyanate or the reaction between polycarbonate and polyisocyanate, among which high molecular weight polymer obtained by the reaction between polycarbonate and polyisocyanate is preferable in view of water-resistance and heat-resistance. Besides, aliphatic or aromatic polyisocyanate such as hexamethylene diisocyanate, xylylene diisocyanate, isophorone diisocyanate, tolylene diisocyanate, diphenylmethanediisocyanate, triphenylmethanediisocyanate or naphthylenediisocyanate, etc. can be used as the polyisocyanate, among which aliphatic polyisocyanate can be preferably used in view of weather resistance.

The silicone resin includes a resin having a siloxane bonding in the fundamental nucleus, preferably a resin having hydrogen, $C_{1-3}$ alkyl, phenyl or alkoxy which is bound to silicon atom. Especially, dimethylsiloxane is more preferable. It is further preferred to use modified silicone resins such as amino modified dimethylsiloxane, epoxy modified dimethylsiloxane or alkyleneoxide modified dimethylsiloxane, or a mixture thereof are preferably used.

The fluororesin includes, for example, tetrafluoroethylene polymer, trifluorochloroethylene polymer, tetrafluoroethylene—hexafluoropropylene copolymer, tetrafluoroethylene-perfluoroalkyl vinyl ether copolymer, tetrafluoroethylene—hexafluoropropylene-perfluoroalkylvinyl ether copolymer, fluorovinylidene polymer, ethylene-tetrafluoroethylene copolymer, etc. The fluororesin is preferably used in the form of dispersion, wherein fine particles of fluororesin are usually dispersed in a dispersant using a dispersing agent, or in the form of emulsion, wherein fine particles of the fluororesin are usually emulsified in aqueous medium using an emulsifying agent.

In this invention, there is no particular limitation to a method for drawing each constituting filaments or conjugated yarns. Per se known methods such as heating the constituting filaments or conjugated yarns in a liquid or gas phase can be used. As to the drawing temperature, it cannot be determined generally, because it varies depending upon the types of constituting filaments or the diameter of the yarns of the present invention. For example, if the diameter of the yarns of the invention is more than about 1 mm, drawing process is conducted preferably at higher temperature than the melting point of the constituting filaments. Besides, if the diameter of the yarns in this invention is less than about 1 mm, drawing process may be carried out either at higher temperature or lower than the melting point of the constituting filaments, but it is preferred to effect the drawing process at such higher temperature. More specifically, drawing temperature is within the range from about 120 to 300° C., preferably from about 130 to 250° C., more preferably from about 130 to 200° C., much most preferably from about 130 to 170° C.

The drawing may be done by single or more steps.

The drawing rate in the drawing process can be appropriately chosen depending on the types of the constituting filaments. Besides, since the drawing rate during drawing process in this invention depends upon whether or not the drawing process is conducted on raw filament, or what level of drawing was done, it cannot be generally determined. To be more specific, the drawing rate is, for example, within the range from about 1.01 to 15. More specifically, in the case that filament which has already been drawn in the manufacturing process is used as a constituting filament like a commercially available filament, the drawing rate is from about 1.01 to 5, preferably from about 1.01 to 3, more preferably from about 2.2 to 3. On the other hand, when said non-drawn filament is used as constituting filament, the drawing rate is from about 1.01 to 15, preferably from about 2 to 10, more preferably from about 4 to 8.

In this invention, tapered shape can be formed during drawing process in the following manner. Specifically, adjustment of drawing speed can realize tapered shape during drawing process. More specifically, by increasing the drawing speed, its diameter becomes smaller along the line, and by decreasing the drawing speed, the diameter becomes larger along the line. As mentioned above, upon changing the drawing speed, the drawing speed preferably tends to gradually increase or decrease. Namely, gradual increase and/or decrease in the drawing speed during the drawing process are preferred. When the drawing speed is a gradual change, it may change either linearly or non-linearly.

The drawing speed during drawing process cannot be easily determined, because it varies depending upon the types of constituting filaments or the thickness of yarns of the present invention. For example, when conjugated yarns composed of plural constituting filaments are drawn, the ratio of drawing speed in forming the thickest portion of the yarns to the thinnest portion of the yarns is 1:2 to 1:6 or so. When the constituting filament is drawn, the ratio of the drawing speed in forming the thickest portion of the diameter to the thinnest portion of the diameter is 1:1.5 to 1:4 or so on.

In this invention, there is no particular limitation to a method of braiding plural constituting filaments, but such braiding process is usually carried out using a braiding machine. For example, 4 constituting filaments are prepared, and the filaments at right or left side are alternately arranged to the center for the purpose of attaining such braiding. The number of constituting filaments used for such braiding is not always 4, but may be 8, 12 or 16. Besides, a core yarn composed of metal wire may be buried in the core of the braided yarns.

In this invention, there is no particular limitation to a method for melt-adhesion of plural constituting filaments. As mentioned above, heat-adhesive resin can be used to fuse the constituting filaments.

In this invention, per se known methods, e.g. pressure extruding coating method, can be employed for coating outer surface of the yarn with a coating resin. Among all, pipe-type extruding coating is preferable. The pipe-type extruding coating wherein a melted coating resin is extruded from the extruder, followed by close fixation of onto the pre-heated core yarns under pressure, whereby excellent close contact of the coating film is attained. Besides, the coating resin may be applied by use of well-known means such as applicator, knife coater, reversed roll coater, gravure coater, flow coater, rod coater, or brush. Alternatively, core yarns are immersed in a tub containing a melted or liquid coating resin, taken out from the tub and squeezed out to remove the extra resin.

In the coating process with said coating resin, yarns of the present invention can be tapered. Well-known methods may be employed for forming such tapered shape. For example, the discharge of the resin can be changed by freely adjusting the rotation number of measuring pumps (gear pump) placed in the extruding machine, and controlling duration of said rotating speed of the pump under specific conditions, whereby tapered shape can be formed in the targeted thick, thin and tapered portions of the yarns with desired lengths. The shape of tapered portion can be changed by adjusting long or short switching time of the measuring pump from high rotation to low rotation, or vice versa.

As described before, a preferable embodiment of yarns in this invention can be a yarn wherein a metal line fragment is buried in the core of yarns along the line with some intervals in a non-continuous manner. Such metal wire-buried yarns can be manufactured in the following way. Namely, plural constituting filaments are braided around the metal wire core to give a braided yarn. Point pressure is given to said braided yarn section to cut the metal wire into its fragments, and then such fragments are subjected to drawing treatment. The detailed description on each process is given below.

The braided yarns can be manufactured in the same manner as mentioned above. Then, point pressure is given to the braided yarn section in order to cut the metal wire into its fragments. There is no particular limitation to the numbers or intervals in cutting the metal wire. The point pressure enough to cut the metal wire is given to one point of the braided cord section. Besides, in place of cutting metal wire by giving the point pressure to the braided yarn section, inscribed groove may be provided. In each case, the pressure is required to a degree that it does not cut the constituting filaments of the braided cord. The method of giving pressure is not limited specifically, but the pressure can be given from one direction with hammer or gear, or something like that, or the pressure can be given from two directions with multi-combination of gears, or preferably the pressure can be given from two directions with two gears in such a manner that the braided yarn is interposed.

Then, drawing treatment follows. The method of drawing is the same as described before.

In the present invention, cutting and drawing processes for the metal wire may be conducted in a continuous manner, not a batch mode. More specifically, spot pressure is given to one point of the desired braided yarn toward its cross section and then said braided yarn is drawn. Such processes are repeated at optional intervals of time to produce the yarn of the embodiment of the present invention. However, it is preferred to repeat such procedures at the same intervals of time.

According to said manufacturing method, the metal wire fragments are buried in the yarns core along the line with some intervals in non-continuous mode. Softness and flexibility can be given to the yarns of the present invention by making metal wire buried in the core fragments and allowing the existence of the portions where the metal wire is not buried.

With respect to yarns of this invention, other post-treatments which are known per se can be applied. For example, yarns in this invention may be colored. The coloration may be carried out by known methods. For example, yarns of this invention are passed through a bath filled with a coloring agent at room temperature, e.g. about 20 to 25° C. Then, the coated yarns are dried and passed through a kiln whose temperature is maintained at about 100 to 130° C., thereby to produce colored yarns.

As coloring agents, inorganic pigments, organic pigments or organic dyes are known. Examples of such coloring agents are titanium oxide, cadmium compounds, carbon black, azo compounds, cyanine dyes, and polycyclic pigments.

The yarns produced according to the present invention can be used for any applications that require low elongation rate, for example, for fishing lines for leisure or fishery uses, marine materials such as long-lining fishing of tuna, rope, gut, kite string, weedeater string, surgical suture, etc.

EXAMPLES

The followings are examples of this invention. Needless to say, applications of this invention are not limited to those examples.

Example 1

Eight of DYNEEMA 150 d/140 F (TOYOBO Co. Ltd.) were round braided into core yarns with a braided machine. The core yarns were dipped-coated with acryl resin (VONCOAT 3750 of DAINIPPON INK AND CHEMICALS Inc.), sent to the kiln and heated to 170° C. with the feed roller speed of 150 m/min, and rolled-up with the rolling speed of 345 m/min, thereby producing yarns of this invention.

Example 2

Four of DYNEEMA 150 d/140 F (TOYOBO Co. Ltd.) as side yarns and a THERMOLUX PO105 300d (LUXILON)) as yarn core were square braided into core yarns with a braided machine. The core yarns were dipped-coated with acryl resin (VONCOAT 3750 of DAINIPPON INK AND CHEMICALS Inc.), sent to the kiln and heated to 160° C. with the feed roller speed of 100 m/min, and rolled-up with the rolling speed of 250 m/min, thereby producing yarns of this invention.

Example 3

A monofilament was manufactured by use of a high specific gravity nylon resin (MCTS00005 chip, specific gravity=3: KANEBO GOHSEN) containing nylon 6/66 (NOVAMID 2030J Chips MITSUBISHI CHEMICAL) and a metal (tungsten, specific gravity=19.3) under the following conditions. Namely, said high specific gravity nylon resin was supplied to an extruder of a 40 mm bore diameter, and melted at 270° C., spun out from a spinneret of a 2.1 mm bore diameter and cooled down in a water bath of 50° C. Then, non-drawn yarns were drawn at a draw ratio of 4.5 by two steps under the conditions of wet heat of 95° C. and dry heat of 220° C. Monofilament with diameter of 0.515 mm was produced by relaxed-heat treatment where it was drawn at a draw ratio of 0.98 at the temperature of 225° C.

Eight of DYNEEMA 150 d/140 F (TOYOBO Co. Ltd.) were round braided around the monofilament as yarn core to produce yarns with core-sheath structure. These core yarns were dipped-coated with a polyurethane resin (VONDIC 1930A-LS: DAINIPPON INK AND CHEMICALS Inc.), supplied to the kiln and heated to 170° C. at the feed roller speed of 100 m/min, and rolled-up at the rolling speed of 250 m/min, thereby to produce yarns of this invention.

Example 4

By use of a lead wire of 1.6 mm diameter as core, eight of ultra-high molecular weight polyethylene non-drawn filaments (DYNEEMA, TOYOBO Co. Ltd.) were round braided into a braided yarn. As the non-drawn ultra-high molecular weight polyethylene filament, 400 d filament which was drawn from the base raw filament at the rate of 25% of the maximum drawing rate was used where the raw filament was 100d when drawn at the rate of the maximum drawing rate.

The raw yarns were dipped-coated with an acryl resin (VONCOAT 3750 of DAINIPPON INK AND CHEMICALS Inc.), supplied to the kiln and heated to 170° C. at the feed roller speed of 100 m/min, and rolled-up with the rolling speed of 400 m/min, thereby producing yarns of this invention.

Example 5

DYNEEMA, 150d/140F (TOYOBO Co. Ltd.), was twisted at the twist parameter of 1.4. Eight of said twisted yarns were round braided. This braided yarn was applied to the hot-melt adhesive (HM320S: CEMEDINE). The amount of hot-melt adhesive applied was 8 weight % of total weight of the yarns. The produced yarns were sent to the kiln and heated to 160° C. at the roller speed of 150 m/min, and rolled-up at the rolling speed of 300 m/min, thereby to produce yarns of this invention.

Example 6

Monofilaments were manufactured under the conditions as mentioned above, using a high specific gravity nylon resin (MCTS00005 Chip, specific gravity=3: KANEBO GOHSEN Ltd.) which contains nylon 6/66(NOVAMID 2030J Chip: MITSUBISHI CHEMICAL) and a metal (tungsten, specific gravity=19.3). Namely, said two chips were blended in a ratio of 50/50 (w/w). The blended product was supplied to an extruder of 40 mm bore diameter, melted at 270° C., spun out from a spinneret of 2.1 mm bore diameter and cooled down in a water bath of 50° C. Then, these non-drawn yarns were drawn at a draw ratio of 4.5 by two steps under the conditions of wet heat of 95° C. and dry heat of 220° C., and subjected to relaxed-heat treatment at 225° C. with a draw ratio of 0.98, thereby to produce monofilaments with a diameter of 0.515 mm.

Eight of DYNEEMA 150 d/140 F (produced by TOYOBO) were round braided around the monofilament as yarn core to produce core yarns. These core yarns were dipped-coated with polyurethane resin (VONDIC 1930A-LS: DAINIPPON INK AND CHEMICALS Inc.), supplied to the kiln heated to 170° C. at the roller speed of 100 m/min, and rolled-up at the feed rolling speed of 200 m/min, thereby to produce yarns of this invention.

Properties of the yarns obtained in the Examples 1 to 6 were measured as follows.

(a) Twist parameter K was calculated by the following equation: $K = t \times D^{1/2}$ (wherein t: the count of twists (rotation/m), D: the fineness (tex))

The fineness was measured according to JIS L 1013 (1999).

(b) Braided angle: Braided angle was measured with Digital HD Microscope VH-7000 (KEYENCE Corp.)

(c) Elongation rate: Elongation rate was measured with the universal testing machine of Autograph AG-100 kNI100kNI (SHIMADZU Corp.) according to JIS L 1013 (1992).

(d) Abrasion resistance was tested as follows.

The testing machine is shown in FIG. 1, which was a modified model of hexagonal bar abrasion testing machine for seat belts, equipped with ceramic guide 2 of 9 mm diameter at the position of hexagonal bar. The stroke length, angle, etc. of said machine were complied with JIS D 4604 (1995). The sample 1, was placed through ceramic guide 2, one end of which was fixed to stationary portion 4 of drum 5 and another end was loaded with load 3. The load was 3.3% of the maximum strength of the sample 1. Thousand times of reciprocating movements of the drum gave abrasion to the sample 1 from the ceramic guide 2. Then, tenacity of the abraded portion of the sample 1 was measured. The residual tenacity (c) was evaluated from the following equation; $c(\%) = a/b \times 100$ wherein the value before abrasion is a and the value after abrasion is b. It was determined that the higher c value is, the better the abrasion resistance is. The tenacity value was measured according to JIS L 1013 (1992) with the universal testing machine of Autograph AG-100kNI (SHIMADZU Corp.).

(g) Specific gravity was measured with an electronic specific gravity meter SD-200L (MIRAGE TRAIDING Co., Ltd.)

TABLE 1

|  |  | Example 1 | Example 2 | Example 3 | Example 4 | Example 5 | Example 6 |
|---|---|---|---|---|---|---|---|
| Twist Parameter |  | — | — | — | — | 0.7 | 1.2 |
| Braided Angle | ° | 8.0 | 22.0 | 24.6 | 15.4 | 24.6 | 25.8 |
| Metal Particle |  | — | — | TW | — | — | TW |
| Metal Wire |  | — | — | — | Lead | — | — |
| Elongation | % | 2.9 | 2.5 | 2.5 | 2.9 | 3.4 | 2.9 |
| Abrasion-Resistance | g/d | 17.5 | 14.2 | 8.5 | 2.1 | 18.8 | 16.6 |
| Specific Gravity | g/d | 0.98 | 1.13 | 2.23 | 9.85 | 0.98 | 1.49 |

In table 1, TW stands for tungsten.

The yarns in Examples 1 to 6 were applied to fishing lines and checked on the easiness of detecting fish bites, that is, the easiness of feeling the point at which fishes are biting the line. All the fishing lines turned out to be excellent. Besides, as for the yarns in Examples 1 to 6, microscopic observation was conducted after abrasion test to see if there was generation of fluffs. As a result, neither fluffs nor fibrils could be observed in any of fishing lines tested.

Example 7

Eight of DYNEEMA 150 d/140 F (TOYOBO Co. Ltd) were round braided into core yarns with a braided machine. The resultant core yarns were dipped in an oil agent containing 70 parts by weight of polyether, 15 parts by weight of polyoxyethylene (polymerization mole number: 30)—caster oil ether, 10 parts by weight of polyoxyethlene (polymerization mole number: 10)—lauryl ether and 5 parts by weight of sodium lauryl sulfate. The core yarns on which the oil agent was deposited were supplied to the kiln, heated to 170° C. at the feed roller speed of 150 m/min, and rolled-up at the rolling speed of 345 m/min, thereby to produce yarns of this invention. The core yarns were washed with water to remove the deposited oil agent, and then dried. The obtained core yarns were dipped-coated with an acryl resin (VONCOAT 3750 of DAINIPPON INK AND CHEMICALS Inc.) to give yarns of this invention.

INDUSTRIAL APPLICABILITY

This invention can provide yarns with low elongation rate and excellent high abrasion resistance by redrawing ultra-high molecular weight polyethylente filaments, wherein the elongation rate is not more than about 5% and the tensile strength is not less than about 14.0 g/d after 1000 times repetitive abrasion test. Besides, combination with other filaments or metal wires, or inclusion of metal particles in said other filaments or coated resins gives advantages that desired specific gravity is adjustable in the production of yarns, regardless of inherent specific gravity of ultra-high molecular weight polyethylene. Further, by combining with other filaments, this invention can provide yarns with various physical properties that cannot be obtained in ultra-high molecular weight polyethylene filament alone.

The invention claimed is:

1. A fishing line comprising a braid of a plurality of ultra-high molecular weight polyethylene filaments and a heat-adhesive resin having a melting point below that of the ultra-high molecular weight polyethylene filaments combined at a temperature lower than the melting point of the UHMWPE filaments and higher than the melting point of the heat-adhesive resin to form the braid, said braid having an elongation rate of not more than 5%.

2. A fishing line as claimed in claim 1, having an elongation rate of not more than 3%.

3. A fishing line as claimed in claim 2, wherein the filaments are twisted with a twist parameter of 0.2 to 1.5.

4. A fishing line as claimed in claim 2, wherein an outer surface of the braid is coated with a resin comprising a synthetic resin possessing a melt index of not less than 0.1 g/10 min.

5. A fishing line as claimed in claim 1, wherein the heat-adhesive resin is a hot-melt adhesive.

6. A fishing line as claimed in claim 1, wherein the heat-adhesive resin is a polyolefin copolymer, a polyester copolymer or a polyamide copolymer.

7. A fishing line as claimed in claim 1, wherein the melting point of the heat-adhesive resin is between 50° C. and 160° C.

8. A fishing line as claimed in claim 1, further comprising another filament that is not an ultra-high molecular weight polyethylene filament.

9. A fishing line as claimed in claim 8, wherein the another filament comprises a polyacetal resin.

10. A fishing line as claimed in claim 8, wherein the another filament contains metal particles.

11. A fishing line as claimed in claim 10, wherein the metal particles are tungsten particles.

12. A fishing line as claimed in claim 8, wherein the another filament is a metal wire.

13. A fishing line as claimed in claim 12, wherein the diameter of the metal wire is not more than 0.5 mm.

14. A fishing line as claimed in claim 12, wherein the metal wire is a lead wire.

15. A fishing line as claimed in claim 12, further comprising metal wire fragments that are buried in a core of the braid along the metal wire with intervals in a non-continuous manner.

16. A fishing line as claimed in claim 8, wherein the elongation rate of the braid is not more than 3%.

17. A fishing line as claimed in claim 1, wherein a braiding angle of the braid is from 5° to 90°.

18. A fishing line comprising a braid of a plurality of ultra-high molecular weight polyethylene filaments and a heat-adhesive resin having a melting point below that of the ultra-high molecular weight polyethylene filaments combined at a temperature lower than the melting point of the UHMWPE filaments and higher than the melting point of the heat-adhesive resin to form the braid, said braid having an elongation rate of not more than 5% and a tensile strength of not less than 14.0 g/d after a 1000 times repetitive abrasion test, and said filaments being twisted with a twist parameter of 0.2 to 1.5.

19. A fishing line as claimed in claim 18, having an elongation rate of not more than 3%.

20. A fishing line as claimed in claim 19, wherein an outer surface of the braid is coated with a resin comprising a synthetic resin possessing a melt index of not less than 0.1 g/10 min.

21. A fishing line as claimed in claim 18, wherein the heat-adhesive resin is a hot-melt adhesive.

22. A fishing line as claimed in claim 18, wherein the heat-adhesive resin is a polyolefin copolymer, a polyester copolymer or a polyamide copolymer.

23. A fishing line as claimed in claim 18, wherein the melting point of the heat-adhesive resin is between 50° C. and 160° C.

24. A fishing line as claimed in claim 18, wherein the elongation rate of the braid is not more than 3%.

25. A fishing line as claimed in claim 18, wherein a braiding angle of the braid is from 5° to 90°.

26. A fishing line as claimed in claim 18, having a color fastness to rubbing of not less than grade 4.

* * * * *